US007964004B2

(12) United States Patent
Koch et al.

(10) Patent No.: US 7,964,004 B2
(45) Date of Patent: Jun. 21, 2011

(54) FEEDING APPARATUS FOR CREATION OF ONE OR MORE PLUGS OF COMPRESSIBLE MATERIAL FOR FEEDING INTO A GASIFIER OR REACTOR

(75) Inventors: Thomas Koch, Søborg (DK); Peter Friehling, Tureby (DK)

(73) Assignee: TK Energi A/S, Koge (DK)

( * ) Notice: Subject to any disclaimer, the term of this patent is extended or adjusted under 35 U.S.C. 154(b) by 868 days.

(21) Appl. No.: 11/941,761

(22) Filed: Nov. 16, 2007

(65) Prior Publication Data

US 2009/0130003 A1 May 21, 2009

(51) Int. Cl.
*B01J 3/02* (2006.01)
*B30B 11/00* (2006.01)

(52) U.S. Cl. ............. 48/61; 100/232; 100/242; 414/173

(58) Field of Classification Search .................. 422/232, 422/233; 208/244; 423/242.1-244.11, 260, 423/530-570, 585, 202, 266; 414/147-216; 100/137-294

See application file for complete search history.

(56) References Cited

U.S. PATENT DOCUMENTS 3,785,281 A * 1/1974 Ligh ............................ 100/116
4,343,233 A * 8/1982 Burgin .......................... 100/116
4,968,325 A * 11/1990 Black et al. ....................... 48/76
5,466,108 A * 11/1995 Piroska ......................... 414/218
2003/0219726 A1 11/2003 Doorbar ............................ 435/5
2005/0081766 A1* 4/2005 McIntosh ...................... 110/286
2007/0199801 A1* 8/2007 Chataing et al. .............. 198/662
2009/0022570 A1* 1/2009 Craig et al. .................. 414/197

FOREIGN PATENT DOCUMENTS

WO WO 93/03709 4/1993
WO WO 93/23709 11/1993
WO WO 02/08764 A1 1/2002

OTHER PUBLICATIONS

International Search Report, PCT/IB2008/054788, mailed Jun. 18, 2009.

* cited by examiner

*Primary Examiner* — Alexa D Neckel
*Assistant Examiner* — Imran Akram
(74) *Attorney, Agent, or Firm* — Winston & Strawn LLP

(57) ABSTRACT

An energy efficient, very flexible and safe feeding apparatus serves for creation of one or more plugs of compressible material for feeding into a gasifier, reactor or other combustion chamber. This apparatus includes a piston feeder with at least three pistons for pre-compressing and delivering compressible material towards a mouthpiece serving as a non-return valve and having an exit end facing a braking device with a friction member for regulating the final degree of compression of the material, and an opposing inlet end for at least partly compressed material. The inner diameter of at least an inlet section extending from the inlet end of the mouthpiece increases towards the first end, so that an angle between the inner wall of at least the inlet section and the longitudinal axis of the mouthpiece is larger than 0° but less than or equal to 3°.

13 Claims, 6 Drawing Sheets

FEEDING APPARATUS FOR CREATION OF ONE OR MORE PLUGS OF COMPRESSIBLE MATERIAL FOR FEEDING INTO A GASIFIER OR REACTOR

BACKGROUND

The present invention relates to a feeding apparatus for creation of one or more plugs of compressible material for feeding into a gasifier or reactor, wherein the apparatus comprises a piston feeder with at least three pistons for pre-compressing and delivering compressible material towards a mouthpiece serving as a non-return valve and having an exit end facing a braking device with friction means for regulating the final degree of compression of the material, and an opposing inlet end for inlet of at least partly compressed material.

An apparatus of this type is, for example, used in connection with combustion of alternative fuels such as residual products like hay, wood chip, scrap paper and other material, which otherwise will be seen as waste materials. These types of materials are often of uneven structure and un-pure, which puts up high requirements for the equipment used for processing them. An example is hay, which can contain impurities such as sticks and even small animals as mice. This of course demands equipment with a large flexibility and with wide operating parameters when it comes to for example, structure, density, hardness and elasticity of the processed materials. This flexibility is even more important as the same equipment is often used to handle different types of materials.

A feeding apparatus of the present type has been disclosed in the applicants own International patent application no. WO 93/23709. While this feeding apparatus solves several problems of the at the time existing feeding apparatuses, which typically use different types of screw feeders for grinding and feeding, it still had some severe drawbacks. These drawbacks are evident when the feeding apparatuses of WO 93/23709 is used in situations where dense plugs are needed and in situations where the pressure difference across the formed plugs are high, as it will be in relation with many modern reactors. The hourglass shape of the mouthpiece in WO 93/23709 allows for only a relatively loose compression of the material as else the pressed plug cannot pass through the narrow part of the mouthpiece. This result in loosely pressed plugs but still with a high risk of blockage of the mouthpiece as is the case in most other feeders within this field of technology. Such blockages are unwanted, as they requires full stop of the machinery in order to be taken care of.

Thus there still exist a need for a feeding apparatus providing a safe, efficient and reliable way for feeding materials into for example a gasifier or reactor.

SUMMARY OF THE INVENTION

In a first aspect according to the present invention is provided an apparatus, which has a primary, and a secondary safety mechanism for preventing the back-draft of for example hot gases from the reactor or gasifier.

In a second aspect according to the present invention is provided an apparatus, which is capable of handling any solid and compressible substance.

In a third aspect according to the present invention is provided an apparatus, which is capable of handling materials with large variations in humidity.

In a fourth aspect according to the present invention is provided an apparatus, which is capable of handling materials with large variations in density, particle size and morphology.

In a fifth aspect according to the present invention is provided an apparatus, which is less prone to congest.

In a sixth aspect according to the present invention is provided an apparatus, which is energy efficient.

The novel and unique features according to the present invention whereby this is achieved is that the inner diameter of at least an inlet section extending from the inlet end of said mouthpiece increases towards the exit end, so that an angle between the inner wall of at least the inlet section and the longitudinal axis of the mouthpiece is larger than 0° but less than or equal to 3°. The great advantage of this specific shape is that it allows for the creation of a plug, which is dense enough to withstand a large pressure gradient across the longitudinal direction of the plug. At the same time the risk of blockage of the mouthpiece is significantly lessened, compared to for example hourglass shaped mouthpieces or to mouthpieces with a negative or zero angle between the inner wall and the longitudinal axis of the mouthpiece.

The invention also relates to methods for the creation of at least one plug of compressible material for feeding into a gasifier or reactor, as well as to a method for controlling the formation of at least one plug of compressible material for feeding into a gasifier or reactor. These methods include use of the apparatus described herein for creation of the plug(s) or controlling the formation of the plug(s).

BRIEF DESCRIPTION OF THE DRAWINGS

The invention will be explained in greater detail below where further advantageous properties and example embodiments are described with reference to the drawings, in which.

DETAILED DESCRIPTION OF PREFERRED EMBODIMENTS

Figure 1:
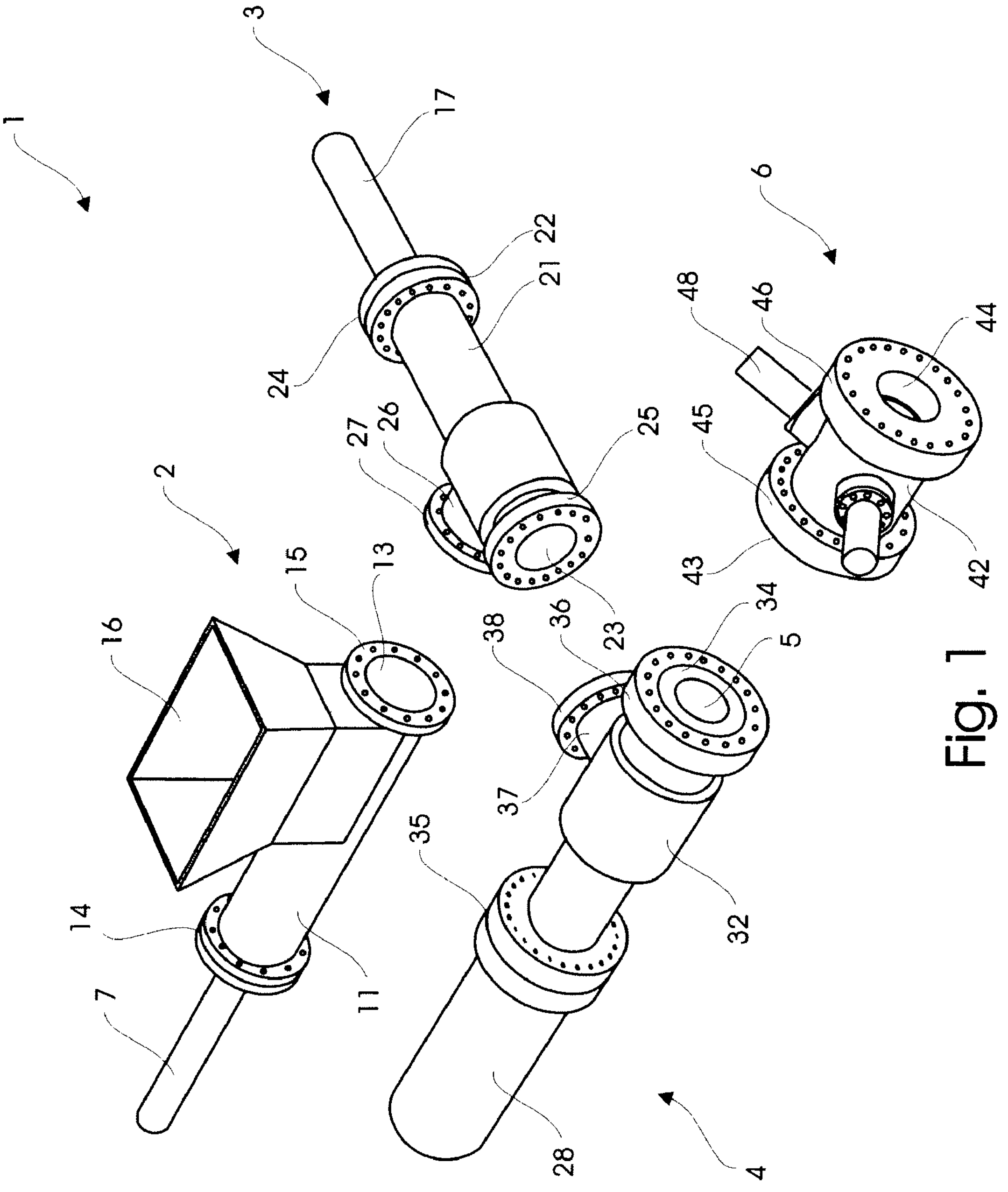
FIG. 1 shows seen in perspective the feeding apparatus according to a preferred embodiment exploded in it main parts.

The invention relates to an energy efficient, very flexible and safe feeding apparatus that serves for the creation of one or more plugs of compressible material for feeding into a gasifier, reactor or other combustion chamber.

Creating a plug with the right density, size and length parameters ensures that the plug cannot be blown back into the feeding apparatus and that gas cannot leak through the plug from the reactor through the piston feeder. Furthermore it ensures a suitable friction between the plug and the inner walls of the mouthpiece and braking device, preventing that the plug is stuck and the system is blocked and a full stop of the feeding process is needed.

The angle between the inner wall of the mouthpiece and the longitudinal axis of the mouthpiece can in a preferred embodiment be larger than 0° but less than 2° or in an even more preferred embodiment be approximately 0.25°

By choosing the angle depending on the dimensions and overall functionality of the apparatus i.e. type of reactor, dimensions of the pipes and pistons etc, the most suitable density of the plug can be accomplished. The inventors of the present feeding apparatus have surprisingly discovered that even such low angles create plugs which are unable to move back through the mouthpiece while at the same time blockage of the mouthpiece is prevented and plug production speed can be maintained very high if wanted.

The dimensions of the piston feeder, mouthpiece and braking device is preferably configured so that the density of the created plug is sufficient to withhold a pressure difference of up to 50 bar across the length of the plug. Preferable the density of the created plug is sufficient to withhold a pressure difference of up to 100 bar across the length of the plug.

In the most preferred embodiment of a feeding apparatus according to the present invention the mouthpiece can be any body of revolution. e.g. conical or trumpet-shaped, for which the inner diameter of the mouthpiece is larger at the exit end than at the inlet end, provided the claimed angular restrictions are met.

Creating a plug capable of withstanding a large pressure gradient along the longitudinal axis of the plug is important in relation to many modern and efficient reactors. The pressure in a reactor or other type of combustion chamber can typically be between 5 and 100 bar, but even higher pressures can also be found. Under these conditions many traditional feeding apparatuses show weaknesses with the risk of "back draft" into the feeding apparatus from the reactor/combustion chamber as a dangerous and unpredictable consequence.

The piston feeder is configured to keep at least one of the at least three pistons closed during operation.

By choosing this configuration a secondary security mechanism is introduced into the system. If gas accidentally is blasted into the feeder from the reactor, gasifier or other combustion chamber, the closed piston will together with the compressible material present in the system form a tight seal. This seal will secure the earlier stages of the piston feeder and prevent further advance/progress of the gas into the system.

The geometry of the feeding apparatus is alterable. Hence the feeding apparatus according to the present invention provides a high degree of freedom of configuration. Depending on the geometry and space in the area where the apparatus needs to be fit in, the pistons can be working in the same plane or more planes if needed. Also the angle of the pistons with respect to each other can be varied to some degree, to defer from the preferred 90°. This can be necessary for example if the apparatus is installed under spatially very tight conditions.

Furthermore, the present invention is very flexible when it comes to what compressible materials are fed into and through the feeding apparatus and also with respect to what reactor, gasifier, other combustion chamber or even for example means for post handling the pressed plugs, is the receiving means after the braking device. Thus there will be a large variance in the conditions under which the feeding apparatus will be installed.

The invention also relates to a method for creation of at least one plug of compressible material for feeding into a gasifier or reactor disclosed herein. This method comprises the steps of:

providing a feeding apparatus as described herein, conveying the compressible material from a container to a last stage of the piston feeder by the use of at least two pistons, pressing the compressible material towards and through the mouthpiece and braking device by the force of the piston of the last stage of the piston feeder, compressing the compressible material in the mouthpiece and braking device by the force of the last piston, forming a plug of compressed material in the mouthpiece, and pressing the plug from the breaking device to a gasifier, reactor or for further processing.

In this method the compressible material is pre-compressed to a suitable density by the at least two first pistons. The third piston conveys and compresses the material further in the mouthpiece and braking device where the compressed material forms a plug, which functions as a safety seal. This method overall ensures a very large flexibility in what kind of compressible materials can be used in the process. If for example, a very low-density material like cotton is used, it is possible to implement one or more extra pistons in the early stage of the piston feeder to ensure a suitable compression of the material before it is conveyed to the last stage of the piston feeder. The piston of the last stage of the piston feeder ensures that the material is compressed to an optimal density in the mouthpiece and braking device. The braking device together with the force and motion of the last piston is a determining factor for the density of the created plug when the compressed plug is pressed through and out of the braking device. From here the plug can preferable be received by means for braking up the plug before it is fed into for example a gasifier, reactor or other combustion chamber. Alternatively the plug can be fed directly into the gasifier reactor or other combustion chamber.

It is possible to adjust or vary the length of the created plug during the process. When the length of the plug is varied, implicitly the friction between plug and the inner sides of the mouthpiece and brake is varied too. Thus the density of the plug is regulated and hereby also how tight a seal the plug can form. Also the plug length can help regulating the over all output of the apparatus. The length of the plug is varied by regulating how far towards the mouthpiece the final piston is pressed.

In a preferred embodiment a plug with a length of preferably 3-5 times its diameter may be created. This interval for the plug length has shown to often be optimal for creating a plug with an appropriate density.

Furthermore it is possible to operate the pistons of the piston feeder so that at all times at least one piston is closed. Furthermore, as mentioned earlier, when at least one of the pistons is closed, the closed piston works as a secondary security mechanism for preventing back-draft of for example hot gases from the reactor, gasifier or other combustion chamber. So by choosing to implement this in the operating routine an extra level of safety is achieved.

Advantageously, the invention also relates to a method for controlling the density and friction of the plug. This method comprises the following steps of:

providing a feeding apparatus as described above, regulating the pressure imposed on the plug by the braking means of the braking device, regulating the length of the plug by controlling any of the position progression of the final piston in the piston feeder, measuring the speed and the pressure of the last piston during one or more stroke, regulating the force and motion of the piston strokes on the basis of measurements during the present stroke and during previous strokes, and signaling to and from a software program collecting, measuring and working up measured data and executing the automation process.

The implementation of the above enables a continuous regulation of the properties of the plug. This means that the compressible material fed into the apparatus does not have to be homogeneous, but in fact can vary in for example grain size, humidity and density.

Within the scope of the present invention a compressible material is by definition any material, which can be compressed to a higher density.

Within the scope of the present invention the properties of the plug comprises at least one or more of the following parameters: density, length, diameter, and friction coefficient.

"Back-draft" is within the scope of the present invention defined as leakage of for example, hot gasses from the reactor, gasifier or other combustion chamber back into and/or through the feeding apparatus. Such gases can be blown out from the reactor, gasifier or other combustion device with a very high pressure and velocity, and can have a very high temperature as well as being reactive and possibly poisonous.

Within the scope of the present invention "the last stage of the piston feeder" is defined as the piston with appurtenant cylinder abutting the mouthpiece; This the last piston of the at least three pistons of the piston feeder performs the final compression of compressible material and presses the material through the mouthpiece and braking device and further out of the feeding apparatus to a gasifier, reactor or for further processing.

Within the scope of the present invention "the first stage of the piston feeder" is defined as the two or more pistons with appurtenant cylinders conveying the compressible material from an inlet to the cylinder appurtenant to the last piston of the piston feeder, i.e. to the last stage. During the transportation from the inlet to the last stage, the compressible material is compressed to a suitable density by the two or more pistons. If needed, extra pistons can be inserted in the first stage of the piston feeder for example in order to obtain extra compression of very low-density materials like cotton.

Within the scope of the present invention a piston is defined as closed when it is fully extended or otherwise in a position where it prevents material from being blown back into the system. For example, in a piston feeder with three pistons, the second piston is closed when it is in a position where material from any of the brake, mouthpiece, third or second piston cylinder can not be blown or otherwise be pressed back into the first piston chamber. The pistons fit the piston cylinders and in the case of a back-draft loose material in the system will quickly form a tight seal together with the piston-head.

Turning now to the drawings, FIG. 1 gives a perspective and partly exploded overview of the main components of an exemplary embodiment of a feeding apparatus with three pistons according to the present invention. This is not to be construed as limiting for the present application as e.g. more pistons can be implemented within the scope of the present invention.

The feeding apparatus, which in general is designated with the reference number 1, is constructed of the main components a first piston section 2, a second piston section 3 and a third piston section 4. An essential part of the third piston section 4 is a mouthpiece 5, the configuration of which will be described in more detail below with reference to FIG. 6. The mouthpiece 5 can be either an integrated part of the third piston section 4 or be a self-contained unit. Another essential part of the present invention is the braking device 6, which will be described in more detail below with reference to FIG. 5.

Figure 2:
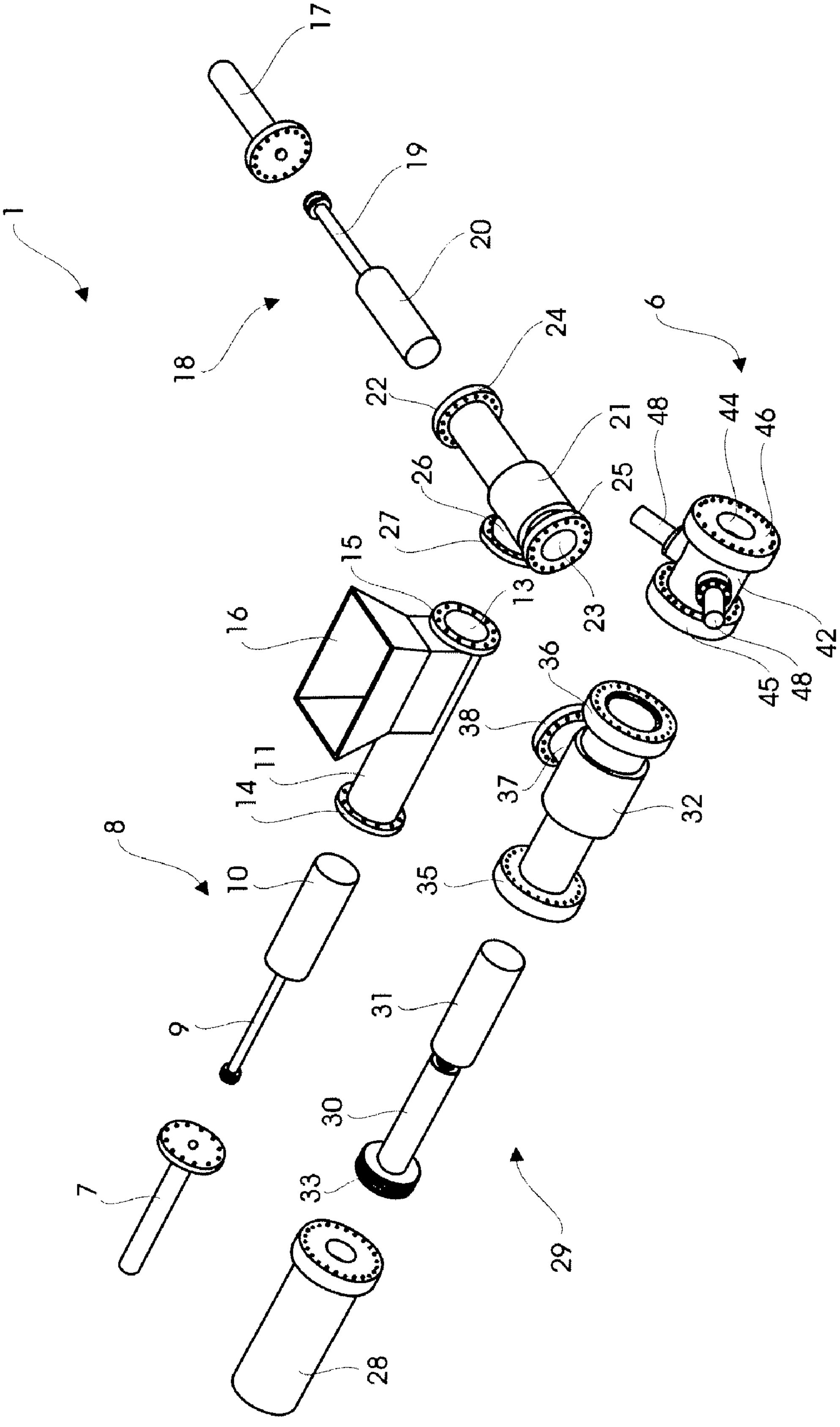
FIG. 2 shows the same but fully exploded.
Figure 3:
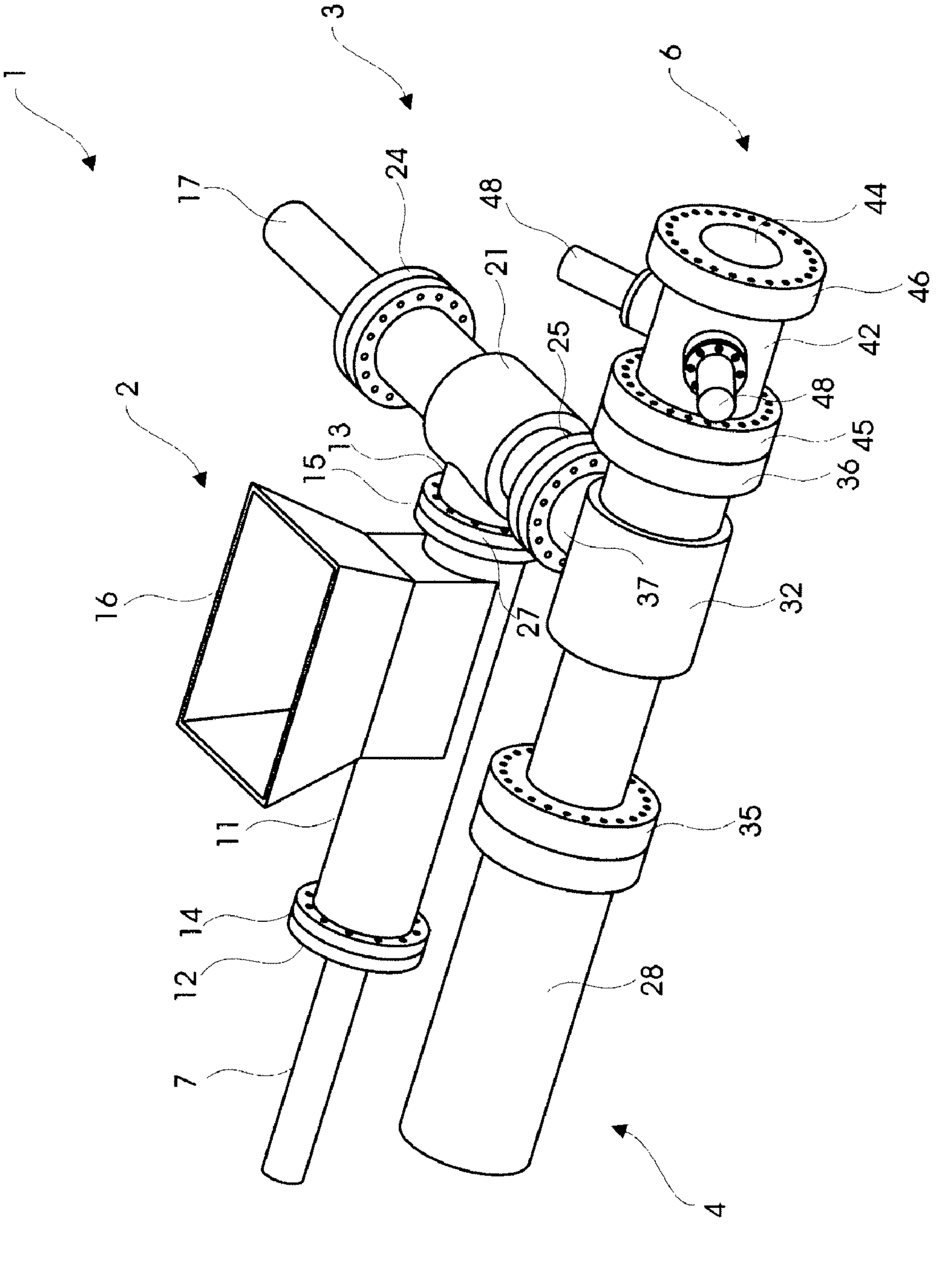
FIG. 3 shows a perspective view of the feeding apparatus shown in FIGS. 1 and 2 in assembled state.

The configuration and assembly of the piston sections 2,3,4 is seen and described in the perspective fully exploded view of FIG. 2, and the assembling of the various parts, sections and components are illustrated in FIG. 3.

The first piston section 2 has an outer piston part 7 and a first inner piston part 8, including driving means for the piston (not shown), a first piston rod 9 and a first piston head 10. The first inner piston part 8 is partly accommodated and reciprocating arranged inside a first cylinder 11 with a first end 12 for receiving the inner piston part 8 and an opposing second end 13 for communication with the second piston section 3. The first end 12 has a first flange 14 for connection with the first outer piston part 7. The second end 13 of the first cylinder 11 has a second flange 15 for connecting the first piston section 2 with the second piston section 3. The first cylinder 11 has an inlet means 16 for receiving compressible material. In the case shown the inlet means is a funnel, which is arranged substantially perpendicular to the longitudinal axis of the first cylinder 11, this is not to be construed as limiting for the present application and other arrangements and inlet devices are foreseen within the scope of the present invention.

The second piston section 3 comprises a second outer piston part 17 and a second inner piston part 18, including driving means for the piston (not shown), a second piston rod 19 and a second piston head 20. The second inner piston part is partly accommodated and reciprocating arranged inside a second cylinder 21. The second cylinder 21 has a first end 22 for receiving the second inner piston part 18 and an opposing second end 23 for communication with the third piston section 4. The first end 22 of the second cylinder 21 has a first flange 24 for connection with the second outer piston part 17. The second end 23 of the second cylinder 21 has a second flange 25 for connecting the second piston section 3 with the third piston section 4. The second cylinder 21 has a cylindrical pipe branch with a opening 26 for providing communication with the first piston section 2, which second opening 26 has a third flange 27 for connection with the second flange 15 of the first cylinder 11.

The third piston section 4 comprises a third outer piston part 28 and a third inner piston part 29 including driving means for the piston (not shown), a third piston rod 30 and a third piston head 31. The third inner piston part 29 is partly accommodated and reciprocating arranged inside a third cylinder 32. The third cylinder 32 has a first end 33 for receiving the third inner piston part 29 and an opposing second end 34 for communication with the braking device 6. The first end 33 of the third cylinder 32 has a first flange 35 for connection with the third outer piston part 28. The second end 34 of the third cylinder 32 has a second flange 36 for connecting the third piston section 4 with the braking device 6. The third cylinder 32 has a cylindrical pipe branch with an opening 37 for communication with the second piston part 3. The opening 37 has a third flange 38 for connection with the second piston section 3. The second end 34 of the third cylinder 32 includes the mouthpiece 5 as an integrated part. The internal detailed configuration of the mouthpiece will be described in more detail with reference to FIG. 4. In a preferred configuration, the compressed material is pressed with a pressure of 600-1000 bar by the inner piston part 29 in the last piston section 4, forming the desired plug in the mouthpiece 5 and braking device 6.

The mouthpiece 5 comprises a cylinder section 39, a first end 40 in communication with the third piston section 4 and an opposing second end 41 for communicating with the braking device 6, which will be described in more detail with reference to FIGS. 6 and 7.

Figure 4:
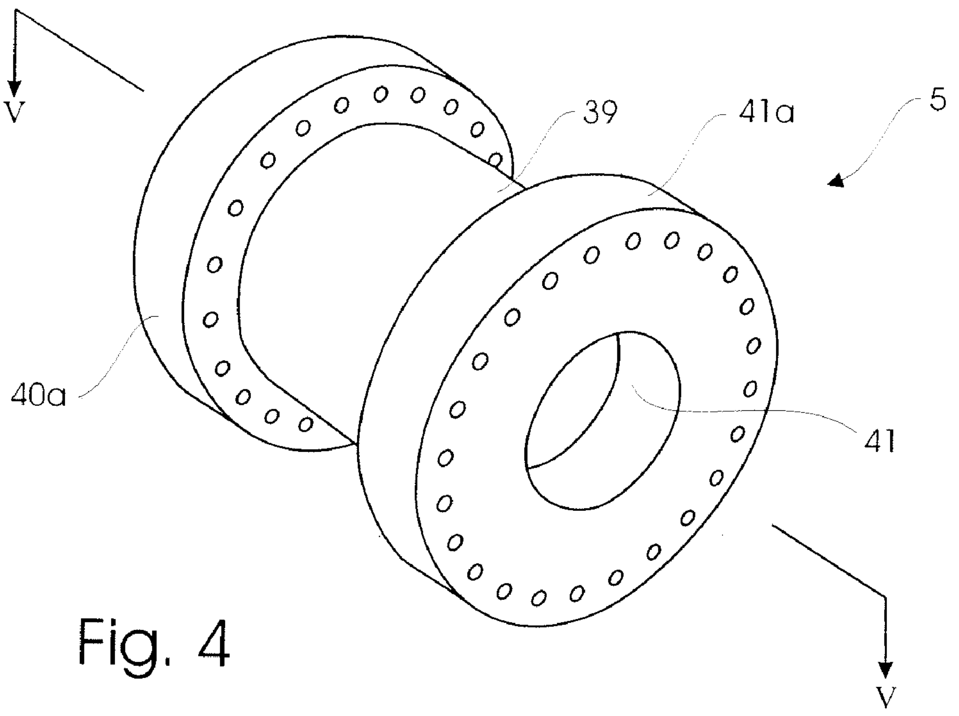
FIG. 4 shows a perspective view of a self-contained mouthpiece according to the present invention.

FIG. 4 is a perspective view of an exemplary embodiment of a self-contained mouthpiece 5 comprising a mouthpiece cylinder section 39, a first end 40 for communicating with the third piston section 4 and an opposing second end 41 for communicating with the braking device 6. The first end 40 of the mouthpiece cylinder section 39 has a flange 40*a* for connecting with the third piston section 4, and the opposing second end 41 has a second flange 41*a* for connection with the braking device 6.

Figure 5:
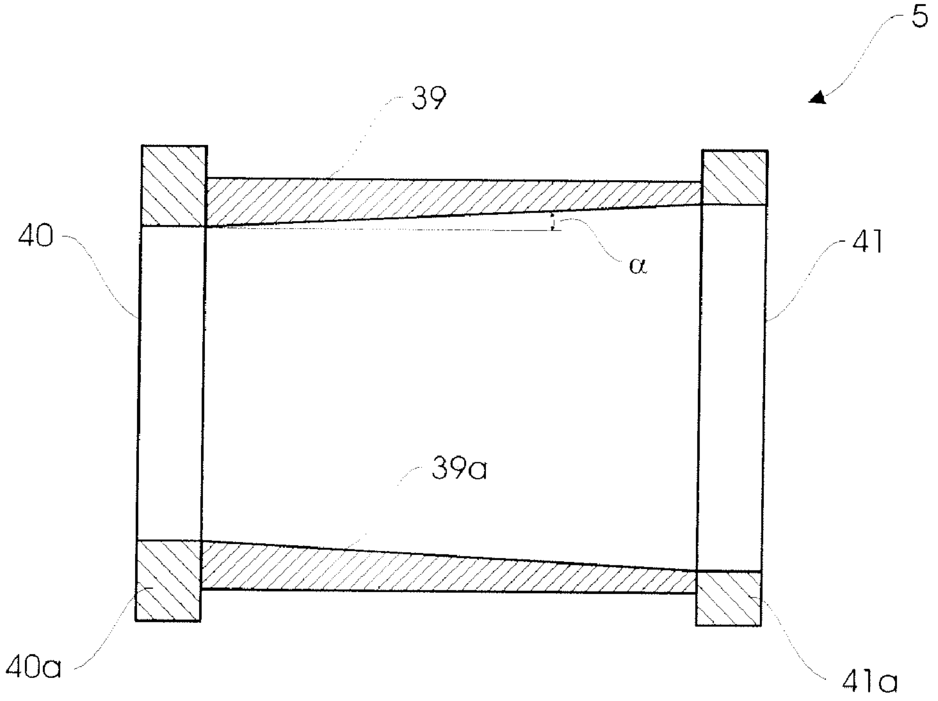
FIG. 5 shows an axial sectional taken along line V-V in FIG. 4.

As seen best in the axial sectional view of FIG. 5 the circumferential inner wall 39*a* of the mouthpiece 5 is conical. In the alternative the wall can be trumpet-shaped as long as the section of the mouthpiece farthest away from the braking device is kept conical with an angle α between the longitudinal axis and the conical inner wall section less than or equal to 3°. The shape of the inner wall 39*a* of the mouthpiece 5 is critical. The above restrictions on the angle α ensures that the formed plugs can obtain the density needed in order for gas from for example the reactor or gasifier, not to leak through and/or around the plug, at the same time ensuring the mouthpiece does not get constipated. It is also of great importance that inexpedient constrictions and irregularities in the mouthpiece are avoided, in order to fulfill the requirements for the created plugs concerning for example density, mechanical strength and ability to function as a seal in the mouthpiece. Thus making the overall design of the inner walls 39*a* of the mouthpiece 5 a decisive factor for the high effectiveness of the present embodiment of the mouthpiece. As the size of the angle α and the design of the mouthpiece are critical parameters of the feeding apparatus 1, it can be a great advantage that the mouthpiece 5 is self-contained in order to enable easy access when maintaining and performing routine checks of the system. Furthermore, the self-contained mouthpiece is providing the possibility of changing the mouthpiece without having to change the entire third cylinder 32. This being an advantage for example if there has been a high level of wear of the inner walls 39*a*, which can possibly result in an unwanted and maybe uneven change in the angle α of the inner walls 39*a* changing the properties of the mouthpiece.

Figure 8:
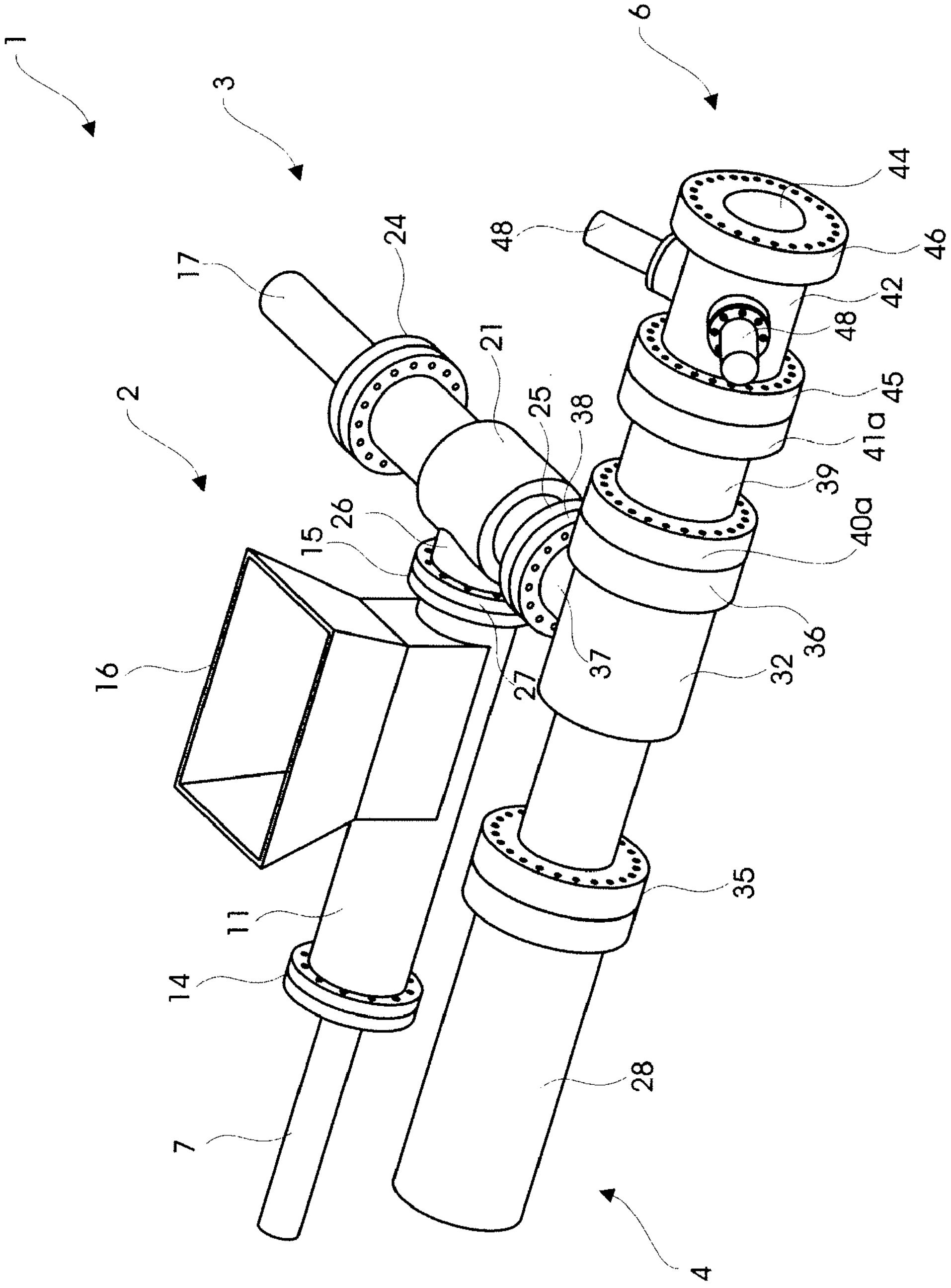
FIG. 8 shows a second embodiment of the feeding apparatus according to the present invention in which the mouthpiece is a separate, exchangeable component.

This self-contained mouthpiece is inserted in the feeding apparatus shown in FIG. 8.

Figure 6:
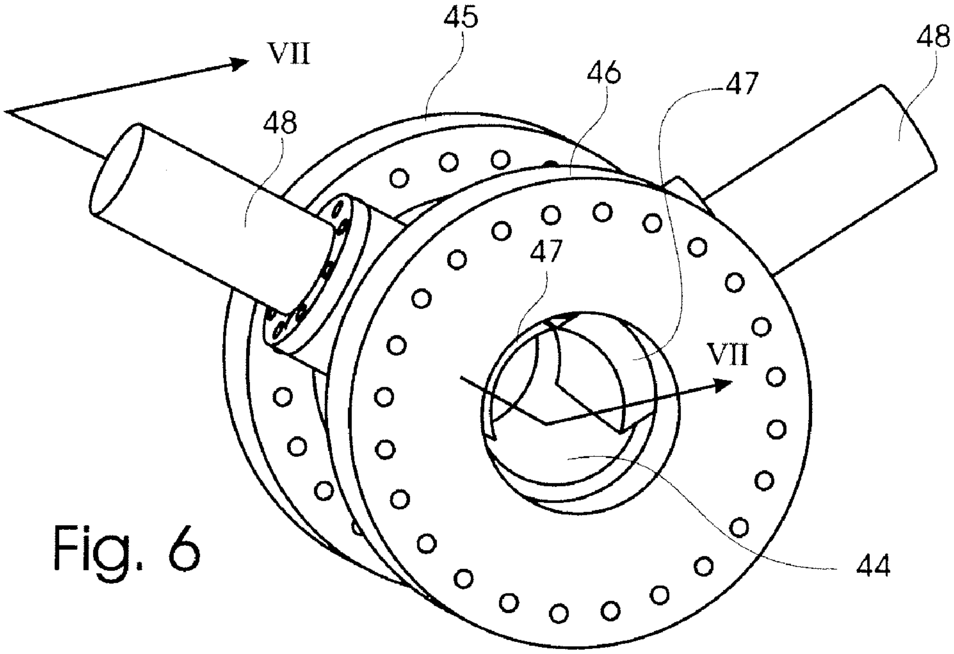
FIG. 6 shows seen in perspective a braking device for final compression of the compressible material.
Figure 7:
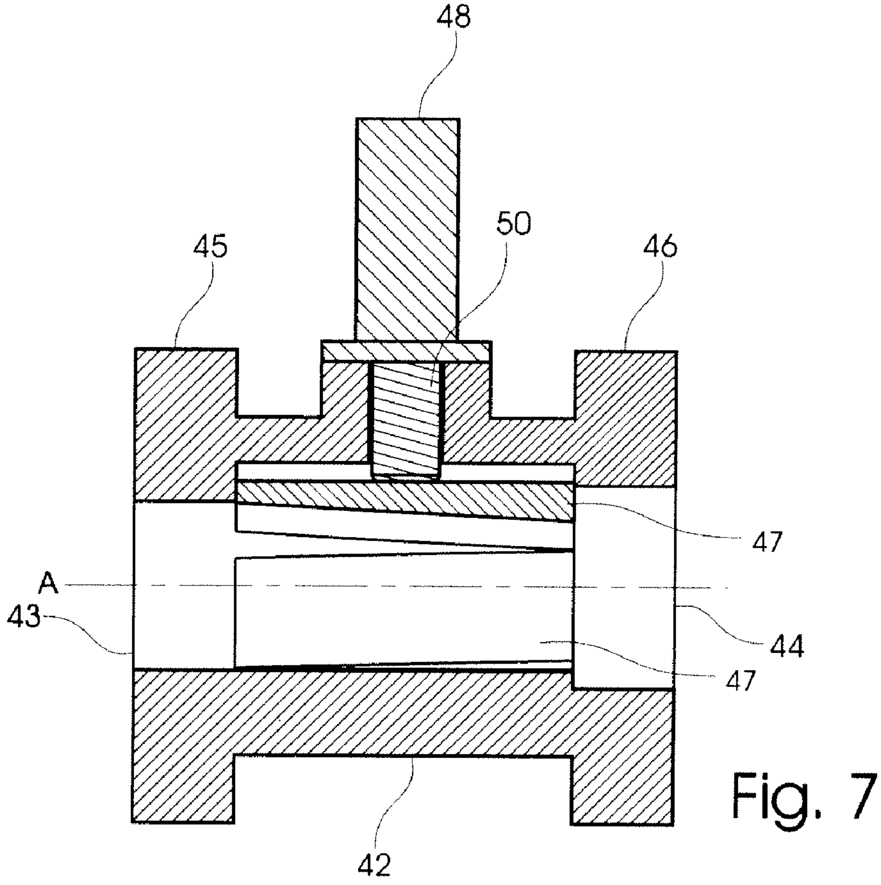
FIG. 7 shows an axial, sectional view of the braking device shown in FIG. 5, taken along line VI-VI.

FIG. 6 shows in an enlarged scale a perspective view of the braking device 6, and FIG. 7 shows the internal arrangement of the friction shoes 47 inside the braking device.

The braking device 6 consists in the embodiment shown of a braking cylinder 42 with a first end 43 to be arranged to communicate with the third piston section 4 through the mouthpiece 5. The braking cylinder 42 has an opposing second end 44 for discharge of the final compressed material to the "external" equipment. The first end 43 of the braking cylinder 42 has a flange 45 for connection to the third piston section 4, and the opposing second end 44 of the braking cylinder 42 has a second flange 46 for connection with the "external" equipment, such as e.g. a combustion unit. The braking device has in the case shown two friction shoes 47 extending substantially perpendicular to the longitudinal axis A of the braking device. The reciprocating action of the friction shoes 47 is regulated by actuation means, e.g. hydraulic means.

As seen best in FIG. 7 the braking device 6 has at least two friction shoes 47 regulated by for example hydraulic means (not shown). A friction shoe piston 50 reciprocating inside for example a hydraulic actuated piston cylinder 48 regulates the pressure of the friction shoe 47 on the compressible material/compressed plug. The piston head 47 fixated on the friction shoe piston 50 constitutes the friction shoe 47. The friction shoes 47 are extending inside the bore 51 of the braking cylinder 42 where they can exert a variable radial pressure force on the plug of compressed material being pressed from the mouthpiece 5 and into the braking device 6. Thus, the friction shoes 47 are delaying the axial progression of the compressible material in the braking device 6, hereby ensuring that the third inner piston part 29 can apply the needed pressure on the compressible material in the third piston cylinder 32, mouthpiece 5 and braking device 6. The radial pressure applied on the compressible material by the friction shoes 47 can also perform an actual compression of the compressible material if such compression is needed. The friction shoes 47 are preferably arched as a sector of a circle or are correspondingly concave to conforming around the plug arriving from the mouthpiece 5 by the action of the piston feeder.

In the present exemplary embodiment of the invention the braking device is mounted with two adjustable friction shoes but this is not the only relevant embodiment and is not to be construed as limiting for the present application. It is for example possible to have more than two adjustable friction shoes and/or one or more fixed friction shoes.

In the present exemplary embodiment of the invention the braking device is mounted with two adjustable friction shoes 47 fixated only on the friction shoe pistons 50. Another possibility is that one or more of the friction shoes 47 are hinged at the end of each friction shoe closest to the mouthpiece 5 and are not fixated on the friction shoe pistons 50. The friction shoes thus being pivoted around each their axis perpendicular to the longitudinal axis A of the braking device by the influence of the motion of the friction shoe pistons 50. The length of the friction shoes is in a preferred embodiment of the present invention 2-4 times the diameter of the formed plug.

FIG. 8 illustrates a second embodiment 49 of a feeding apparatus according to the present invention. The second embodiment 49 corresponds substantially to the first embodiment 1, and for like part same reference numerals are used.

The second embodiment 49 differs from the first embodiment only in that the mouthpiece function is obtained by means of the separate, exchangeable mouthpiece shown in FIGS. 4 and 5 inserted before the braking device 6.

EXAMPLE

A compressible material for example wood chip, is fed into the feeding apparatus 1 through the inlet 16, which in the present embodiment is a funnel. The wood chip is by the use of the inner piston part 8 pre-compressed and conveyed to the second piston section 3. From here the wood chip is by the use of the inner piston part 18 of the second piston section 3 further pre-compressed and conveyed to the third and final piston section 4. From the third piston section 4 the now twice pre-compressed material is pressed through the mouthpiece 5 and further into the braking section by the inner piston part 29 of the third piston section 4. The friction shoes 47 regulate the friction between the compressible material/pressed plug and the braking device 6 in order to provide a plug with the most suitable density. The speed of the piston head 31 is measured and the pressure of the friction shoes 47 on the created, pressed plug is regulated on the basis of these speed measurements. For example, in the case of the wood chip, it is possible that a portion of the compressible material is very moist, resulting in that when the material is compressed in the mouthpiece and brake, water is pressed out of the material and forms a layer of water between the compressed plug and the friction shoes and/or inner wall of the mouthpiece. This water will lower the friction between the compressed plug and the friction shoes and/or inner wall of the mouthpiece, making the pressed plug progress faster in the mouthpiece and brake, and thereby allowing for the piston head 31 to move faster forward. This change in speed can be registered and on the basis on these speed data, the pressure of the friction shoes on the pressed plug can be increased. Furthermore, the maximum progression of the piston-head 31 of the third piston section can be regulated. When the piston head 31 is allowed to progress further towards the mouthpiece 5 the plug becomes shorter and visa versa when the piston head stops its motion further away from the mouthpiece 5 the plug becomes longer. This can be used as an extra control of the friction between compressed plug and the inner wall of the mouthpiece and/or braking device as the over all friction of the plug is increased when the length of the plug is increased. From the braking device the pressed plugs are pressed out of the feeding apparatus.

The data acquisition is in a preferred embodiment carried out by a computer handling the measurements of for example the speed of the piston head and/or the pressure exerted by the inner piston part 29. The computer can via software be carrying out different relevant calculations and on the basis of these be regulating for example the pressure exerted on the compressed plug by the friction shoes, the progression of the third piston head 31, and the speed and pressure of the inner piston part 29. The computer can also be regulating the overall movements of all the at least three inner piston parts ensuring that at least one is closed at any given time.

The parameters including the progression of the piston head 31, the pressure exerted by the inner piston part 29 and the radial pressure exerted by the friction shoes, can be varied in order to ensure a density of the created plug suitable for the pressure gradient it must be able to withstand. By being able to adjust the parameters above during operation of the feeding apparatus, the overall process is fast and the end product—the pressed plugs—are of high quality and reliably suiting their purpose as for example fuel in a reactor, even though the compressible material let into the feeding apparatus is of very varying character.

The diameter of the pistons of the at least three piston sections of the piston feeder decrease from the first to the last piston of the piston feeder. This means that the piston of the first piston section has the largest diameter and the piston of the last piston section has the smallest diameter. In this way the capacity of the first piston section for receiving compressible material does not become limiting for the output of the feeding apparatus.

In a preferred embodiment the feeding apparatus is configured so that the energy consumption used for pressing the plugs by use of the feeding apparatus is maximum 1% of the thermal value of the plug.

Thus an energy efficient, very flexible and safe feeding apparatus for feeding and compressing compressible material into a reactor, gasifier or other combustion chamber is hereby presented.

What is claimed is:

1. A feeding apparatus for creation of one or more plugs of compressible material for feeding into a gasifier or reactor, the apparatus comprising:

a piston feeder comprising at least three pistons configured to pre-compress and convey compressible material;

a mouthpiece serving as a non return valve in communication with the piston feeder and having an inlet end configured to receive at least partly compressed material from the piston feeder, wherein the inner diameter of at least an inlet section extending from an inlet end of said mouthpiece increases towards an exit end, so that an angle between the inner wall of at least the inlet section and the longitudinal axis of the mouthpiece is larger that 0° but less than or equal to 3°;

a braking device situated at the exit end of the mouthpiece with friction means for regulating the final degree of compression of the material;

wherein at least two pistons are configured to pre-compress and convey the compressible material to a third piston and the third piston is configured to convey and further compress the material through the mouthpiece to the braking device to form a plug of compressed material which functions as a safety seal.

2. The feeding apparatus according to claim 1, wherein the angle between the inner wall of at least the inlet section of the mouthpiece and the longitudinal axis of the mouthpiece is larger than 0° but less than 2°.

3. The feeding apparatus according to claim 1, wherein the angle between the inner wall of at least the inlet section and the longitudinal axis of the mouthpiece is substantially 0.25°.

4. The feeding apparatus according to claim 1, wherein the mouthpiece is conical or trumpet-shaped.

5. The feeding apparatus according to claim 1, wherein the dimensions of the piston feeder, mouthpiece and braking device is configured so that the density of the created plug is sufficient to withhold a pressure difference of up to 50 bar across the length of the plug.

6. The feeding apparatus according to claim 1, wherein the dimensions of the piston feeder, mouthpiece and braking device is configured so that the density of the created plug is sufficient to withhold a pressure difference of up to 100 bar across the length of the plug.

7. The feeding apparatus according to claim 1, wherein the piston feeder is configured to keep at least one of the at least three pistons closed during operation.

8. The feeding apparatus according to claim 1, where the geometry of the apparatus is alterable.

9. A method for creation of at least one plug of compressible material for feeding into a gasifier or reactor, wherein the method comprises the steps of:

providing a feeding apparatus according to claim 1, conveying the compressible material from a container to a last stage of the piston feeder by the use of at least two pistons, pressing the compressible material towards and through the mouthpiece and braking device by the force of the piston of the last stage of the piston feeder, compressing the compressible material in the mouthpiece and braking device by the force of the last piston, forming a plug of compressed material in the mouthpiece, and pressing the plug from the breaking device to a gasifier, reactor or for further processing.

10. The method according to claim 9, wherein the length of the created plug is adjusted or varied.

11. The method according to claim 9, wherein a plug having a length of preferably 3-5 times its diameter is created.

12. The method according to claim 9, wherein the pistons of the piston feeder are operated so that at all times at least one piston is closed.

13. A method for controlling the formation of at least one plug of compressible material for feeding into a gasifier or reactor comprising the steps of providing an apparatus according to claim 1, regulating the pressure imposed on the plug by the braking means of the braking device, regulating the length of the plug by controlling any of the position progression of the final piston in the piston feeder, measuring the speed and pressure of the last piston during one or more stroke, regulating the force and motion of the piston strokes on the basis of measurements during the present stroke and during previous strokes, and signaling to and from a software program collecting, measuring and working up measured data and executing the automation process.

* * * * *

UNITED STATES PATENT AND TRADEMARK OFFICE

CERTIFICATE OF CORRECTION

PATENT NO. : 7,964,004 B2
APPLICATION NO. : 11/941761
DATED : June 21, 2011
INVENTOR(S) : Koch et al.

It is certified that error appears in the above-identified patent and that said Letters Patent is hereby corrected as shown below:

Column 10:
Line 1, after "larger", change "that" to -- than --.
Line 61, after "steps", change "of" to -- of: --.

Signed and Sealed this
Second Day of August, 2011

David J. Kappos
*Director of the United States Patent and Trademark Office*